United States Patent [19]

Hashidate et al.

[11] Patent Number: 4,747,193
[45] Date of Patent: May 31, 1988

[54] PALLET SUPPLY APPARATUS FOR MACHINE TOOL

[75] Inventors: Akitake Hashidate, Zama; Katsuyuki Nakamura, Machida, both of Japan

[73] Assignee: Makino Milling Machine Co., Ltd., Tokyo, Japan

[21] Appl. No.: 898,137

[22] Filed: Aug. 19, 1986

[30] Foreign Application Priority Data

May 20, 1986 [JP] Japan .................................. 61-113474

[51] Int. Cl.[4] .............................................. B23Q 7/00
[52] U.S. Cl. ..................................... 29/33 P; 29/563; 198/346.1; 414/222; 414/749; 901/7
[58] Field of Search ....................... 29/33 P, 563, 568; 198/346.1, 465.1; 414/222, 223, 225, 749, 751; 901/7

[56] References Cited

U.S. PATENT DOCUMENTS

| | | | |
|---|---|---|---|
| 3,986,617 | 10/1976 | Blomquist et al. | 29/563 |
| 3,995,752 | 12/1976 | Tamura et al. | 414/282 |
| 4,566,837 | 1/1986 | Shiomi et al. | 198/346.1 |
| 4,626,160 | 12/1986 | Shiomi et al. | 414/222 |

FOREIGN PATENT DOCUMENTS

| | | |
|---|---|---|
| 2631971 | 5/1983 | Fed. Rep. of Germany . |
| 3101661 | 11/1984 | Fed. Rep. of Germany . |
| 3431349 | 3/1986 | Fed. Rep. of Germany ........ 29/563 |
| 58-90451 | 5/1983 | Japan . |
| 223553 | 12/1983 | Japan ............................. 198/346.1 |
| 1131 | 1/1984 | Japan ................................. 29/563 |
| 37035 | 2/1984 | Japan ................................. 29/563 |
| 209745 | 11/1984 | Japan ................................. 29/563 |
| 8264 | 1/1986 | Japan ................................. 29/563 |

OTHER PUBLICATIONS

Magazine DE-Z: Maschinenmarkt 1985, 16, pp. 263–266.

*Primary Examiner*—Gil Weidenfeld
*Assistant Examiner*—Daniel W. Howell
*Attorney, Agent, or Firm*—McAulay, Fields, Fisher, Goldstein & Nissen

[57] ABSTRACT

An apparatus for supplying a pallet to a machine tool has two rows of pallet supports and a pallet carrier between the two rows. The two rows of pallet supports consist of one or more modules so that a change of the number of pallet supports can be easily achieved. The pallet carrier moves along and at a right angle to the two rows, and can be positioned under a desired pallet. The pallet carrier lifts the desired pallet and transfers it to the machine tool by only linear movement.

20 Claims, 8 Drawing Sheets

PALLET SUPPLY APPARATUS FOR MACHINE TOOL

BACKGROUND OF THE INVENTION

1. Field of the Invention

The present invention relates to a pallet supply apparatus for a machine tool for performing an exchange of pallets between a plurality of rows of pallet supports and the machine tool. In particular, the invention relates to the pallet supply apparatus for at least one machine tool which apparatus is capable of supplying a desired pallet sequentially from a plurality of pallets on a plurality of pallet supports to a pallet exchange station immediately in front of the machine tool.

2. Description of the Related Art

As an example of a pallet supply apparatus for a machine tool, there is known an apparatus using a stacker crane, as disclosed in Japanese Unexamined Patent Publication (Kokai) No. 58-90451 base on U.S. Ser. No. 323,465 filed on 1981.11.20 which is now abandoned. The stacker crane is movable in a longitudinal direction between parts stocking structures. A fork of the stacker crane moves forward and backward at a right angle to the longitudinal direction of travel and is movable in the vertical direction (i.e., up and down). Thus, the stacker can remove, transfer, and deliver a pallet from and to different locations in the parts stocking structure. The structure of the stacker crane, however, must be able to bear the weight of a very heavy pallet during the lifting, lowering and transfer thereof, and accordingly, the stacker crane inevitably is large in size. Further, as support members must be provided in the forward and backward movement mechanism, the structure of the stacker crane is also complicated. Further, since a parts preparation station is usually located away from the parts stocking structure, a conveyor is necessary to connect the parts preparation station and the parts stocking structure, and this necessitates the use of a larger floor area.

A pallet supply apparatus is also known in which a fork type transfer vehicle moves between a pallet stacker arranged in a straight line and a group of machine tools, to remove and deliver pallets.

This pallet supply apparatus must comprise not only a plurality of means for performing the linear motion which enables the transfer vehicle to move along the pallet stacker, or to move the fork up and down and forward and backward, but also a means for rotating the vehicle between the minus 90 angle degrees and the plus 90 angle degrees corresponding to the pallet stacker position and the machine tool position respectively. Therefore, the moving mechanism is complicated and the transfer efficiency of pallets is unsatisfactory, and further, a large area is needed for rotating large pallets.

SUMMARY OF THE INVENTION

It is an object of the present invention to provide a pallet supply apparatus for at least one machine tool, which is able to transfer a large or heavy pallet and in which the moving mechanism is simplified by excluding the forward and backward movement mechanism of the fork, by which the pallets are removed and delivered, and excluding an actuator for rotating the fork, to achieve a reduction of the area needed for operation of the apparatus.

In accordance with one aspect of the present invention, there is provided a pallet supply apparatus for at least one machine tool, the apparatus having a plurality of pallet supports, each pallet support being capable of supporting a pallet, comprising a first row of pallet supports disposed along a line including at least one pallet exchange station which is disposed immediately in front of the machine tool and an exchange of pallets is carried out at the pallet exchange station, a second row of pallet supports disposed in parallel with the first row of pallet supports and placed at a predetermined distance from the first row, and a pallet carrier disposed between the first row of pallet supports and the second row of pallet supports and movable in parallel with the first and second rows of pallet supports and able to gain access to a pallet support of the two rows to remove and deliver a pallet.

By the apparatus mentioned above, the reduction of an area necessary for the arrangement of the pallet supports can be achieved.

In a preferred embodiment of the present invention, the pallet supply apparatus further comprises pallet carrier guiding means for guiding the pallet carrier during movement of said pallet carrier in parallel with the two rows, and the pallet carrier comprises means for lifting a pallet from and lowering a pallet onto each of the pallet supports of the first and second rows, the lifting means is arranged so as to be moved at a right angle to the first and second rows when the pallet carrier is to access the one of the pallet supports.

By the apparatus mentioned above, the pallet carrier can lift the pallet resting on the pallet support from a position under the pallet support, and move along a line at a right angle to the two rows of pallet supports and another line parallel with the two rows and lower the pallet onto the pallet support positioned at the pallet exchange station. As the lifting means in the pallet carrier of the apparatus is constructed so as to lift a pallet, a cantilever fork, a forward and backward moving mechanism of the fork, and a fork rotating mechanism can be omitted, and the apparatus can still transfer even a very large or very heavy pallet.

In a further preferred embodiment of the present invention, the pallet supply apparatus further comprises at least one preparation station for removing a machined workpiece from a pallet and setting a workpiece to be machined on a pallet, the preparation station being located on a predetermined one of the pallet supports of the first and second rows of pallet supports.

By the apparatus mentioned above, as one or more of the pallet supports are allocated as the preparation station, extra area for the preparation station is not needed, and a reduction of the needed area can be achieved.

In a further preferred embodiment of the present invention, the first and second rows of pallet supports in the pallet supply apparatus are constructed by a plurality of pallet support modules, and each module comprises a first unitary row of the first row of pallet supports, a second unitary row of the second row of pallet supports, and joining means for joining another pallet support module to each end of each module, the each end being an end in the same direction as a direction in which the first and second unitary rows are extended.

By the apparatus mentioned above, as the first and second rows of pallet supports are constructed by one or more modules, each including first and second unitary rows, an increase or decrease in the number of pallet supports can be easily achieved by changing the number of modules.

In accordance with another aspect of the present invention, there is provided a pallet supply apparatus for transferring a pallet between at least one machine tool and a pallet storage area, comprising:

at least one pallet support module arranged along a line which is adjacent to the machine tool, the module, comprising a first unitary row of pallet supports disposed along the line, a second unitary row of pallet supports disposed in parallel with the first unitary row of pallet supports and placed at a predetermined distance from the first unitary row, this predetermined distance being the same for each pallet support module, and joining means for joining another pallet support module to each end of module, each end being an end in the same direction as the direction in which the first and second unitary rows are extended; and a pallet carrier disposed between a first row which is constructed by an arrangement of at least one first unitary row along the line, and a second row which is constructed by an arrangement of at least one second unitary row along the line, being movable in parallel with the line, comprising means for lifting one pallet resting on one pallet support of the first or second row and lowering one pallet onto another pallet support, and guiding means for guiding the lifting means at a right angle to the line.

BRIEF DESCRIPTION OF THE DRAWINGS

The present invention will now be more easily apparent from the ensuing description of the embodiments thereof with reference to the accompanying drawings wherein.

DESCRIPTION OF THE PREFERRED EMBODIMENTS

Figure 1:
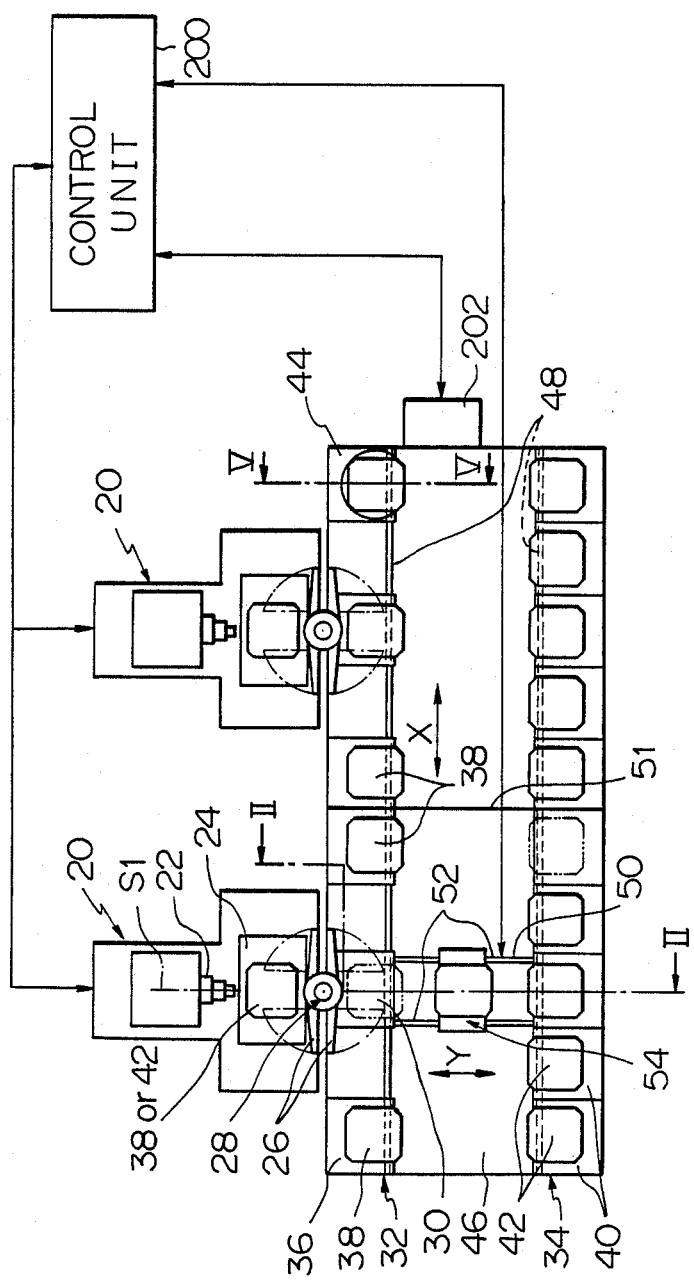
FIG. 1 is a schematic top plan view of a pallet supply apparatus for a machine tool according to the present invention, including machine tools having pallet changers.

Referring to FIG. 1, a machine tool 20 comprises a column including a spindle head 22 and a bed carrying thereon a worktable 24. A pallet changer 28 having two pairs of pallet gripping arms 26 is disposed immediately in front of the worktable 24. The pallet changer 28 grips a used pallet on the worktable 24 and a new pallet on a pallet exchange station 30 in front of the worktable 24 by each pair of pallet gripping arms 26 respectively and exchanges the positions of both pallets at the same time by rotating 180 degrees about an axis, so that the two pallets can be simultaneously exchanged.

A first row 32 of pallet supports is constructed by an arrangement of a plurality of pallet supports along a line including the pallet exchange station 30. The first row 32 is extended along a horizontal X direction at a right angle to an axis S1 of a spindle equipped rotatively in the spindle head 22 of the machine tool. Further, a second row 34 of pallet supports parallel with the first row 32 is disposed at the side away from the machine tool 20. The second row 34 is facing to and separated from the first row 32. A pallet 38 is rested on each pallet support 36, excluding an area in which the pallet gripping arms 26 of the pallet changer 28 rotate, on the top of the first row 32. Each pallet 38 is rested in a predetermined situation, and a pallet 42 is rested on each pallet support 40 of the second row 34 in the same situation as the pallet 38.

In this embodiment, the same machine tool 20 as the aforesaid machine tool 20 having the pallet changer 28 is juxtaposed with another pallet changer at the same side of the first row 32 as the aforesaid machine tool 20. The pallet support at the right end of the first row 32 is allocated to a preparation station 44 for removing and setting a workpiece. The first and second rows 32 and 34 of the pallet supports are fixed on a base 46. A pair of rails 48 extended along the X direction are fixed on the base 46 near each row 32 or 34 respectively between the two rows 32 and 34.

A carrier base 50 is disposed at a right angle to the rails 48 and is moved along the horizontal rails 48 by a first driving means, described later. A carrier saddle 54 is disposed so as to be movable along a pair of guiding rails 52 laid on the top of the carrier base 50 along a horizontal Y direction at a right angle to the aforesaid rails 48 by a second driving means, described later. A pallet carrier comprises the carrier base 50, the carrier saddle 54, the first driving means, the second driving means, and a lifter to be described later.

The two rows of pallet supports according to the present invention can be easily made by a set of modules. In this embodiment, two sets of pallet support modules (eight pallet supports per one module) are disposed for two machine tools 20, joining two pallet support modules to each other at a joining line 51. In this way, an increase of pallet supports in accordance with an increase of machine tools 20, or an increase of pallet supports where the number of the machine tools 20 is constant, can be easily achieved.

In the case where the machine tool is not in front of the increased modules, the space for the pallet gripping arms 26 to rotate in order to exchange pallets is not needed. Therefore, the pallet support modules having five pallet supports on one side and another five pallet supports on the other side can be prepared.

Figure 2:
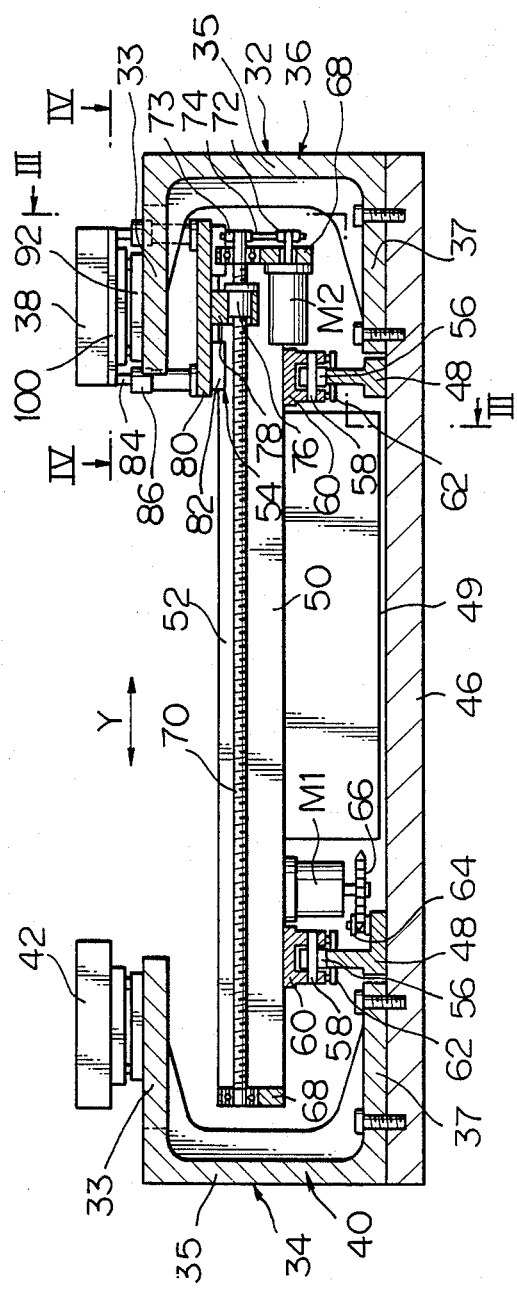
FIG. 2 is a sectional view taken along the line II—II of FIG. 1.
Figure 3:
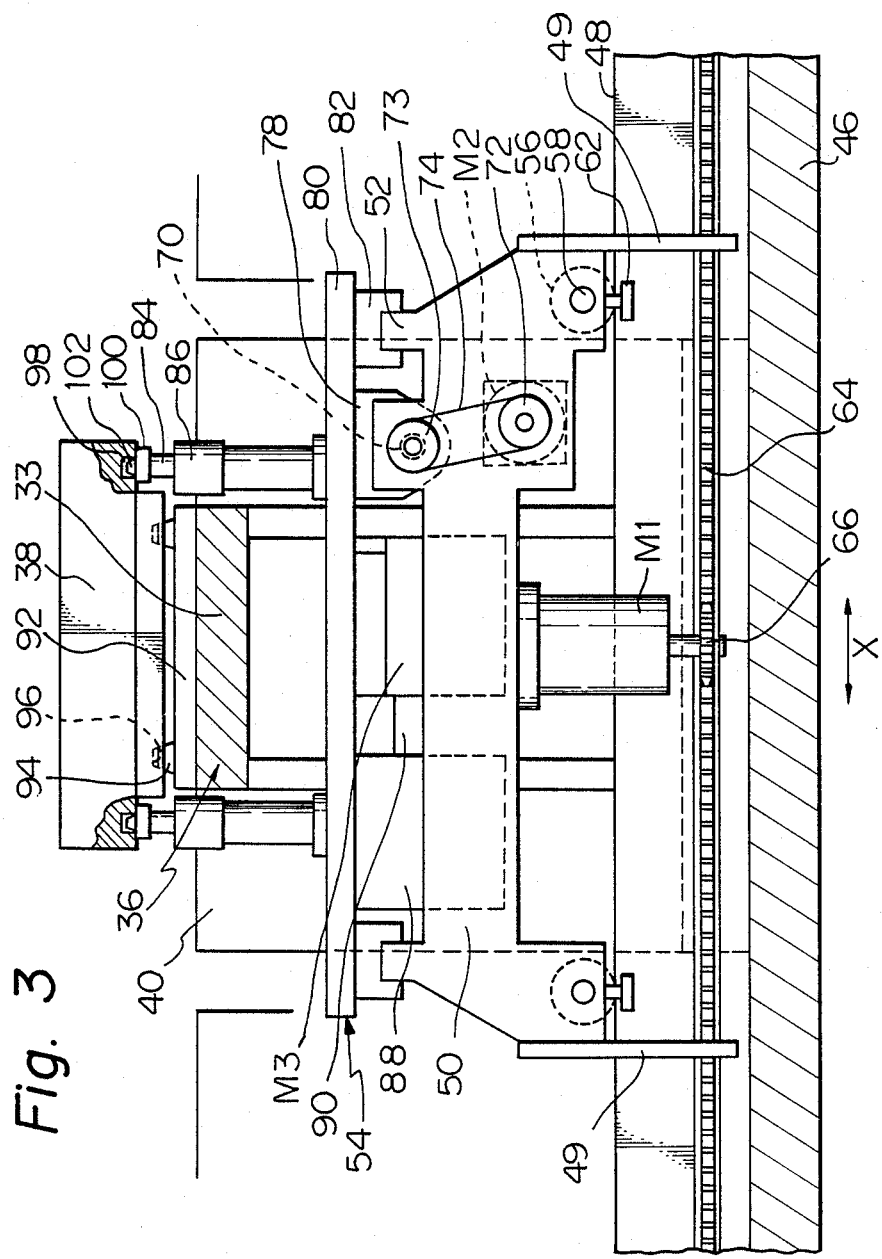
FIG. 3 is a partially broken sectional view of a lifter taken along the line III—III of FIG. 2.

Referring to FIGS. 2 and 3, the aforesaid first and second driving means will be now described. Here, a description will be given of the construction of the first driving means which moves the carrier base 50 carried on the carrier saddle 54 along the rails 48 i.e., the X direction parallel to the two rows 32 and 34, and positioned at the position corresponding to the desired pallet on the two rows 32 and 34 of pallet supports.

A pair of rails 48 are fixed on the base 46 in parallel with each other, disposed near the base part of each of the pallet supports 36 or 40 of the row 32 or 34. The pallet supports 36 and the pallet supports 40 are fixed at each side of the base 46 by bolts respectively and opposed to each other, and have openings inside the two rows 32 and 34. The carrier base 50 is carried on the pair of rails 48 through the medium of a plurality of wheels 56 (four wheels in the embodiment). Each wheel 56 is retained to roll along the rail 48 by a shaft 58 which is retained in a bracket 60 fixed on the lower face of the carrier base 50 at a position corresponding to the position of the rail 48. As each wheel 56 must be retained so as not to come off the rail 48, a pair of side rollers 62 are retained at the ends of the bracket 60 to hold the rail 48 therebetween, and to rotate along both sides of the rail 48. A chain 64 is fixed to the flange of one of the rails 48 which is near the second row 34. The chain 64 is extended along the length of the rail 48 in parallel with the rail 48.

A servo motor M1 is fixed on the lower face of the carrier base 50 near the upper position the chain 64, by a bracket, and a driving shaft of the servo motor M1 is extended vertically towards the base 46. A sprocket 66 engaged with the fixed chain 64 is horizontally fixed to the driving shaft. Therefore, the sprocket 66 is rotated by rotation of the servo motor M1, and is moved along the fixed chain 64. As a result, the carrier base 50 moves along the direction in which the fixed chain is extended, i.e., the X direction.

The joining of pallet support modules can be achieved by a joining device, for example, bolts (not shown). In that case, the base 46, a pair of rails 48 and the chain 64 of one pallet support module can be confronted with the base 46, a pair of rails 48 and the chain 64 of another pallet support module adjacent to the aforesaid one pallet support module, respectively. As a result, the carrier base 50 can move from one end to the other end of the row of pallet supports constructed by a plurality of modules. A plate 49 is disposed on each side of the carrier base 50 in the X direction to remove dropped matter, for example, chips dropped on the base 46, automatically when the carrier base 50 moves along the X direction.

Now, the construction of the second driving means will be described, which moves the carrier saddle 54 horizontally along the aforesaid pair of guiding rails 52 laid on top of the carrier base 50 in the Y direction in parallel with each other, to position it at the predetermined position under the desired pallet. A ball screw shaft 70 is disposed along the Y direction between both end plates 68 opposing each other at the box-shape carrier base 50. The ball screw shaft 70 is journaled rotatively on both end plates 68 through bearings. Another servo motor M2 is fixed on the inside face of one of the end plates 68 which is under the pallet support 36 of the first row 32, and the driving shaft of the servo motor M2 is extended toward the outside of the box-shape carrier base 50 in the Y direction. Each pallet support of the two rows 32 and 34 is constructed mainly by a top table 33, a base table 37, and a side plate 35. There is such sufficient space between the top table 33 and the base table 37 so that the carrier base 50 can be constructed in the shape extended into the pallet supports 36 and 40. A pulley 72 is fixed on the end of the driving shaft of the servo motor M2, and another pulley 73 is fixed on the end of the ball screw shaft 70 extended through and outside the end plate 68. A transmission belt 74 is equipped between the pulleys 72 and 73. A nut 76 is engaged with the ball screw shaft 70. The nut 76 is fixed to a carrier plate 80, which is one element of the carrier saddle 54 and is a base, through a nut bracket 78. Therefore, the carrier saddle 54 can be moved along the Y direction by a feed screw mechanism comprising the nut 76 and the ball screw shaft 70. Four linear guides 82 are fixed on the lower face of the carrier plate 80, and every two guides 82 are engaged with every one guiding rail 52. As each linear guide 82 is provided with an antifriction bearing, the carrier saddle 54 can move smoothly on the guiding rails 52.

The servo motor M2 is driven by means of NC control, and transmits the rotation to the pulley 72, the transmission belt 74, the pulley 73, and then to the ball screw shaft 70. The rotation of the ball screw shaft 70 makes the nut 76 engaged with the shaft 70 move along the shaft 70 to move the carrier plate 80 through the nut bracket 78. As a result, the carrier saddle 54 is moved along the Y direction, and positioned at the predetermined position under the desired pallet support's top table 33.

Figure 4:
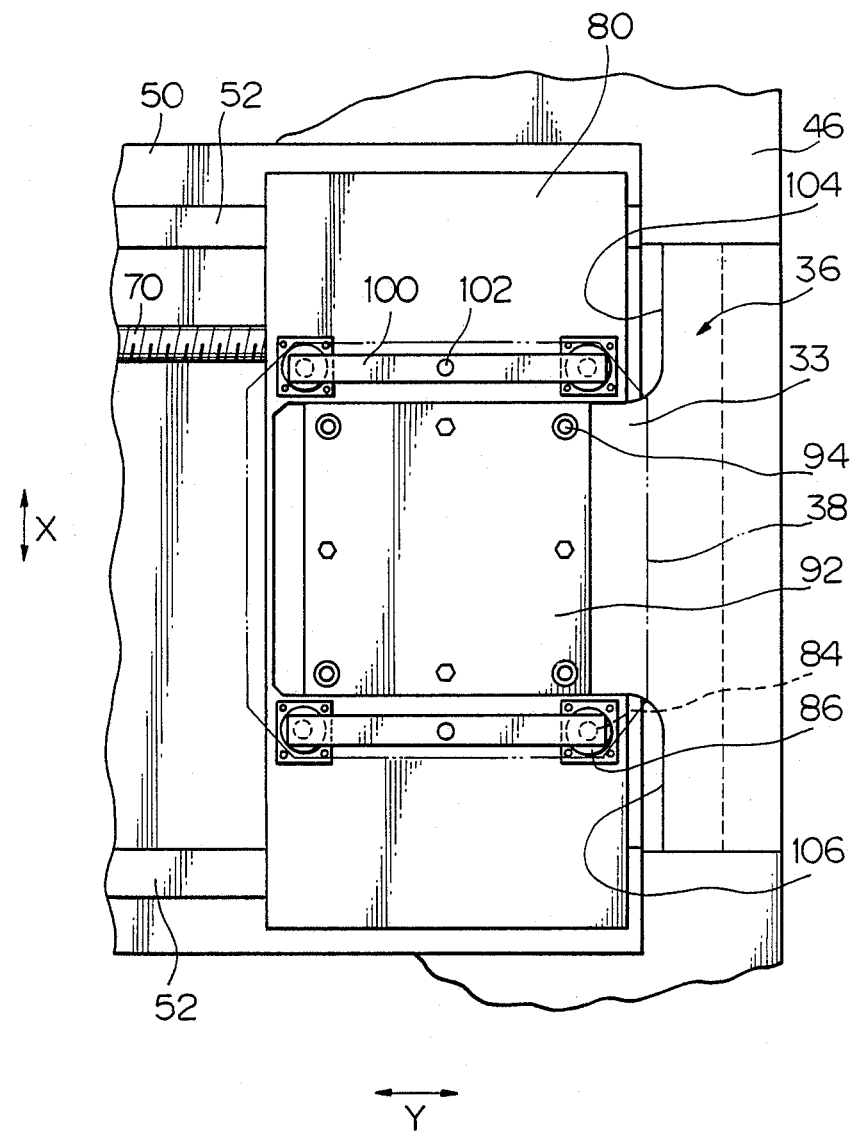
FIG. 4 is a partially broken sectional plan view of the lifter taken along the line IV—IV of FIG. 2.

The construction and operation of the lifter which is provided in the pallet carrier to lift and lower the pallet on the pallet support in the position under the desired pallet support's top table will be described referring to FIGS. 2 to 4. Four hydraulic cylinder devices each comprising a piston 84 and a cylinder 86, are installed in a standing posture at the required positions (four corners in the embodiment) on the carrier plate 80 respectively. The operating system will be described below. The oil tank 88 is fixed on the lower surface of the carrier plate 80. A motor M3 is also fixed on the lower surface of the carrier plate 80, near the oil tank 88, by a bracket, and a hydraulic pump 90 driven by the motor M3 is installed between the oil tank 88 and the motor M3 to be connected with the oil tank 88. The piston 84 is moved up when the pressurized oil fed from the hydraulic pump 90 is supplied to the cylinder 86, and moved down when the oil feed is stopped. Further, four hydraulic cylinder devices operate at the same time respectively, and maintain the pistons 84 in the same height position.

The positioning of the pallet is as follows. A positioning plate 92 is fixed on the pallet support 36 or 40 by means of bolts. Four well-known cones 94 for positioning a pallet are disposed on the upper face of the plate 92. On the other hand, four cone holes 96 are arranged and configured on the lower face of the pallet 38 or 42, corresponding to four cones 94. The pallet 38 or 42 is positioned accurately and stably by the engagement of the cones 94 with the cone holes 96. FIG. 3 shows the posture in which the pallet 38 of the row 32 is rested on the pallet support 36 in such a way. Further, two receiving holes 98 are arranged and configured in each pallet in order to engage with the lifter as shown in FIG. 3.

A rectangular resting plate 100 is fixed over every two piston tops arranged in the Y direction of the four pistons 84. The resting plate 100 is provided with a pin 102 in the middle of the longitudinal length of the upper face of the resting plate 100. The pin 102 is configured so as to engage with the receiving hole 98. Therefore, the pallet 38 or 42 carried on the lifter does not shift during the moving of the pallet carrier. FIG. 3 shows the posture at the time when the pallet 38 is lowered onto the pallet support 36 from the resting plate 100, and the cones 94 engage with the cone holes 96. Conversely, the posture at the time when the resting plate 100 carries the pallet 38 thereon from the pallet support 36 to lift the pallet 38 is the same. As the plates 100 resting on the piston 84 must be moved up or down, and the carrier saddle 54 having the lifter mounted thereon must be moved along the guiding rails 52, i.e., in the Y direction, while lowering a pallet onto the resting plates 100 in such a way, the both sides of the top table 33 of each pallet support 36 or 40 are cut away as shown in FIG. 4.

The lifter using the hydraulic cylinder device has been described above, but an apparatus using a pneumatic cylinder device can be used.

Figure 5:
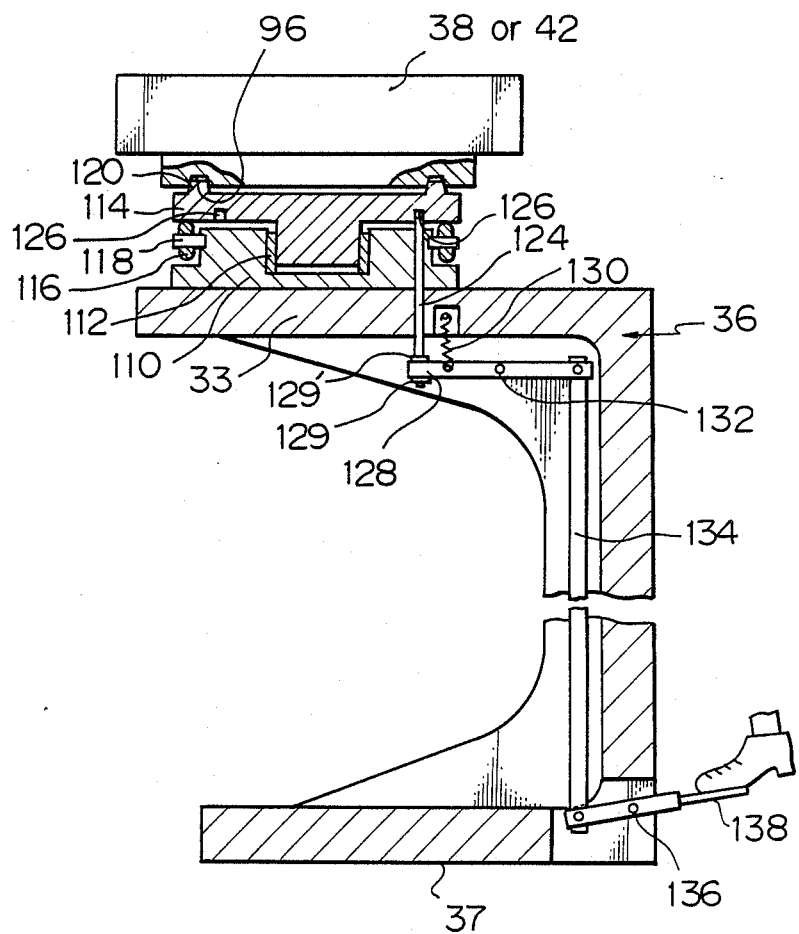
FIG. 5 is a sectional view of a preparation station taken along the line V—V of FIG. 1.

A pallet support 36 at the right end of the first row 32 in FIG. 1 is allocated for a work table of the preparation station 44 for removing and setting a workpiece on the pallet. Referring to FIG. 5, the construction and operation of the preparation station 44 will be described below. A base 110 for rotation having a recess in the middle of the base 10 is fixed on the top table 33 of the pallet support 36. A rotating plate 114 is retained rotatively in the recess through a plain bearing 112, and the rotating plate 114 is supported by a plurality of supporting roller devices installed on the side face of the base 110. In the embodiment, the number of supporting roller devices is four, and each device is disposed around the side of the base 110 at every 90 degrees. Each device is constructed by a pin 118 projected from the side of the base 110 and a roller 116 rotatively mounted on the pin 118. Therefore, the rotating plate 114 can rotate on the plain bearing 112 while being supported by the supporting roller devices. Four cones 120 are arranged and configured on the upper face of the rotating plate 114, for engaging with and position the cone holes 96 of each pallet 38 or 42, as well as the positioning plate 92.

The operator must change the direction of the pallet 38 or 42 by rotating it so as to be easily able to perform the preparation of removing or setting a workpiece on the pallet 38 or 42 from the right side in FIG. 5. Therefore, the base 110, rotating plate 114 movable through the medium of the plain bearing 112 and four rollers 116 are equipped on the preparation station 44 as the device for rotating the pallet 38 or 42. The rollers 116 reduce the friction force by the rolling contact with the plate 114 when the rotating plate 114 carrying a heavy pallet 38 or 42 is rotated. Therefore, the device for rotating the pallet makes it possible for operator to manually rotate the pallet easily.

Now, a clamping device for positioning the rotating plate 114 carrying thereon the pallet 38 or 42 at the desired rotating position will be described below. A stopping bar 124 passes vertically through the top table 33 of the pallet support 36 and the base 110. Receiving holes 126 are arranged and configured on the lower face of the rotating plate 114 in order to engage with the stopping bar 124. The number of receiving holes 126 is four. Each receiving hole 126 is disposed corresponding to each side face of the pallet 38 or 42 resting on the rotating plate 114. The stopping bar 124 is usually engaged with the receiving hole 126 to fix the rotating plate 114 to the pallet support 36 with the pallet 38 or 42. To this end, a lever 128 having a fulcrum 132 is disposed under the top table 33. The lever 128 has a hole larger than a diameter of the stopping bar 124 at one end. The stopping bar 124 is passed through the hole at its lower end, and two rings 129 and 129' are fitted to the lower end so as to hold the lever 128 between the two rings 129 and 129'. As a result, the stopping bar 124 moves vertically with the lever 128 and does not move horizontally. The coil spring 130 is mounted between the top table 33 and the lever 128. The lower end of the coil spring 130 is fixed at the position between the fulcrum 132 and the one end of the lever, and the upper end is fixed at the top table 33. Therefore, the coil spring 130 pulls up the stopping bar 124 through the medium of the lever 128. An upper end of a rod 134 extended vertically is pinned to the other end of the lever 128. A lower end of the rod 134 is pinned to a inner end of a pedal member 138 pivoted on a fulcrum 136 disposed in the base table 37. An outer end of the pedal member 138 is projected outside so that the operator can step on the outer end of the pedal member 138. Therefore, where the pallet 38 or 42 must be rotated during the preparation, the operator steps on the pedal member 138 to push up the rod 134 and to pull down the one end of the lever 128. By this, the stopping bar 124 engaged with the receiving hole 126 is pulled down to come off the receiving hole 126. As a result, the rotating plate 114 resting the pallet 38 or 42 thereon can be rotated.

The lifter of the pallet supply apparatus described in the foregoing is the first embodiment using the hydraulic cylinder device. In the following, the second embodiment of the lifter using a chain-sprocket mechanism and a feed screw mechanism will be described. The description of the construction of the apparatus except for the lifter will be omitted as it is the same as the first embodiment.

Figure 6:
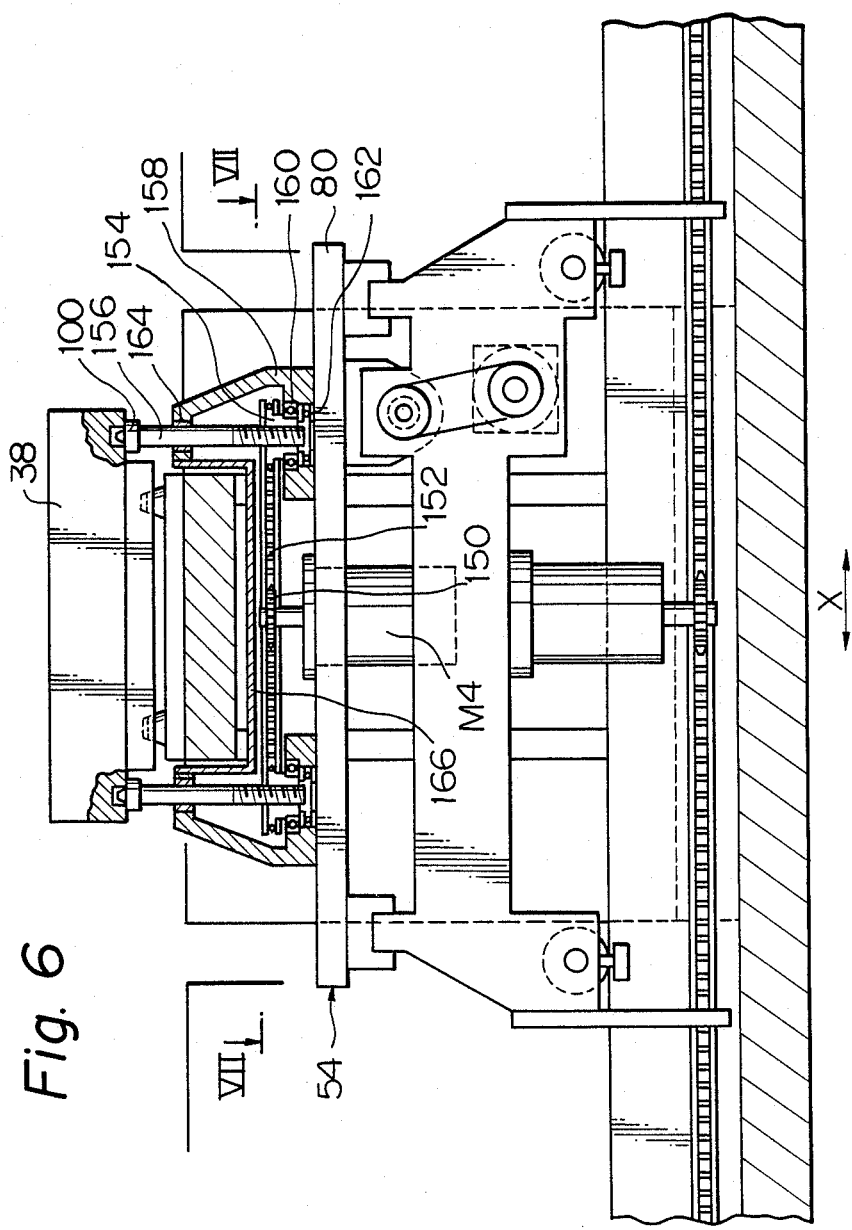
FIG. 6 is a partially broken sectional view of another embodiment of the lifter, according to the present invention, taken along the line III—III of FIG. 2.
Figure 7:
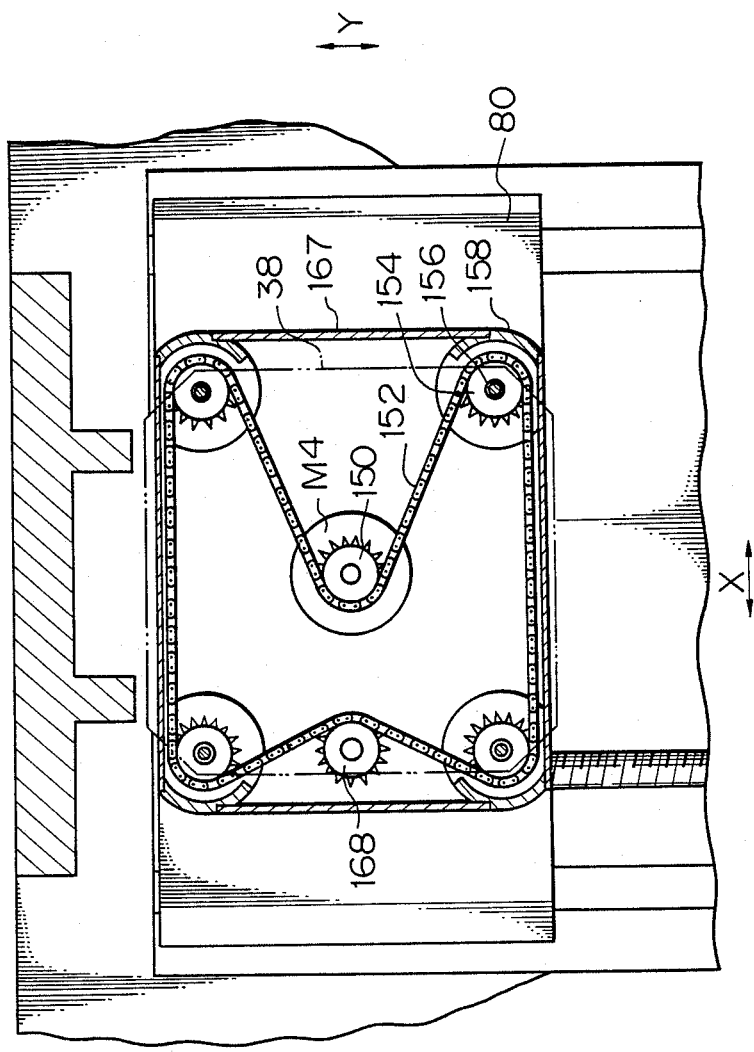
FIG. 7 is a partially broken sectional plan view taken along the line VII—VII of FIG. 6.

A motor M4 is mounted at the middle of the carrier plate 80 as shown in FIGS. 6 and 7. The driving shaft of the motor M4 is extended vertically upward. A sprocket 150 is mounted on the end of the during shaft. On the other hand, four bearing supports 158 are fixed on the carrier plate 80. A sprocket 154 including a nut is rotatively mounted in a recess of each bearing support 158. The sprocket 154 is journaled by a rotating bearing 160 and a thrust bearing 162. The nut engaged with a feed screw shaft 156 mentioned later is mounted on, or formed in one body with the sprocket 154 coaxially with a rotating axis of the sprocket 154.

The sprocket 150 and four sprockets 154 are disposed at the same height. An endless chain 152 is stretched on the above five sprockets. Therefore, the four sprockets 154 are rotated at the same time by the rotation of the motor M4. Further, a tension sprocket 168 is mounted at a desired position outside the endless chain 152 so as to secure a tension of the endless chain 152. The tension sprocket 168 is disposed so as to enable an adjustment of the tension of the endless chain 152. Covers 166 and 167 are fitted over the six sprockets, the chain 152, the motor M4, four feed screw shafts 156, and bearings 160 and 162 so that dust or chips may not enter therein. The feed screw shaft 156 is supported at approximately the middle of the shaft 156 by the bearing support 158 through the medium of a bush 164. The resting plate 100 is fixed horizontally on the tops of each two feed screw shafts 156 arranged along the Y direction. As each feed screw shaft 156 is restricted in this way so as not to rotate, each feed screw shaft 156 moves up or down, keeping the same height, when four sprockets 154 are rotated by the rotating force transmitted from the motor M4 through the endless chain 152. In this case, both the upper limit and lower limit moving positions of the feed screw shaft 156 can be detected. A detecting signal is emitted from a detector, for example, the limit switch (not shown) when the feed screw shafts 156 reach the upper limit position, so that the motor M4 stops and the feed screw shafts 156 stop. When a signal for moving down is emitted when the feed screw shafts 156 are at the upper limit position, the motor M4 is rotated reversely and the feed screw shafts 156 move down toward the lower limit position. The motor M4 is stopped by the limit switch when the feed screw shafts 156 reach the lower limit position, and the feed screw shafts 156 are retained there.

The lifter using a chain-sprocket mechanism and a feed screw mechanism above-mentioned operates in the same way as the lifter using the hydraulic cylinder device.

Figure 8:
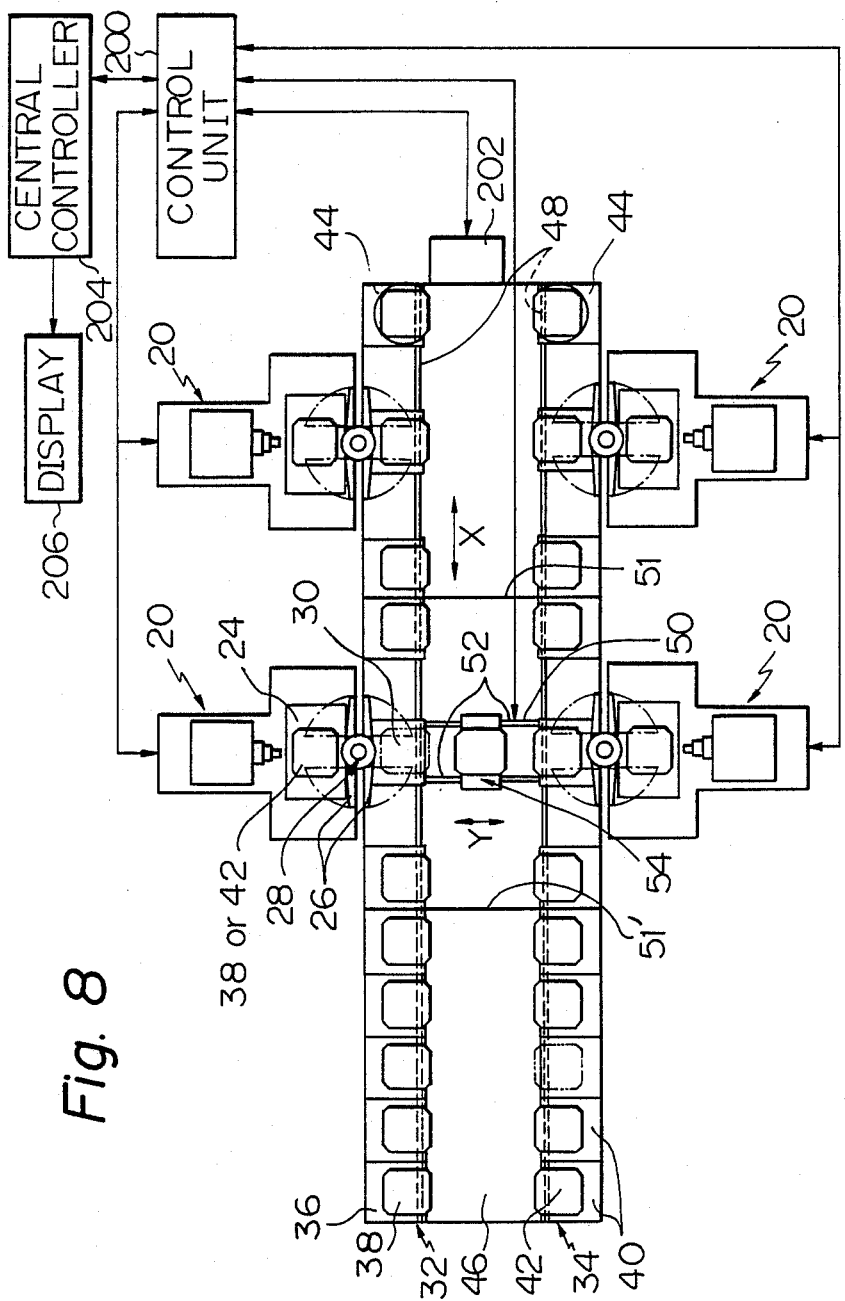
FIG. 8 is a schematic top plan view of another embodiment of the apparatus according to the present invention.

Another embodiment of the pallet supply apparatus according to the present invention will be described below, referring to FIG. 8. The first row 32 of pallet supports and the second row 34 of pallet supports are disposed in parallel with each other and at a predetermined distance from each other between four opposing machine tools 20 for every two machine tools 20. The pallet changer 28 having two pairs of pallet gripping arms 26 is located immediately in front of the worktable 24 of each machine tool 20. The pallet exchange station 30 for exchanging pallets is located in front of each machine tool 20. As a result, there are two pallet exchange stations 30 in the first row 32 and two in the second row 34. The operation of the pallet changer 28 is the same as in the first embodiment. There is a space of one pallet support each side of each pallet exchange station 30 so that the pallet gripping arms 26 may rotate.

In this embodiment, two first modules, each having three pallet supports 36 in a first unitary row of the first row 32 and another three pallet supports 40 in a second unitary row of the second row 34 are used and joined to each other at a joining line 51 of the bases 46. Further, a second module of the same size as the first module having five pallet supports in the first unitary row and second unitary row respectively is joined to the left end of the first modules at another joining line 51' of the bases 46. The carrier base 50 can move along the X direction on the rails 48 from one end of the row of pallet supports constructed by the modules to the other end, and the carrier saddle 54 moves along the Y direction on the guiding rails 52 to be positioned under the desired pallet. The operation of lifting or lowering the pallet is the same as in the first embodiment. The pallet support at the right end of the first row 32 and the pallet support at the right end of the second row 34 are allocated for the preparation stations 44. The operation of the preparation stations 44 is the same as in the first embodiment. Each machine tool 20, each pallet changer 28, and the pallet supply apparatus are operated automatically in response to the signal from the outside. Where a workpiece is removed from the pallet 38 or 42 or set on it further at the preparation station 44, one machining system is constructed. The scale of the machining system can be changed freely by increasing or decreasing the number of modules, i.e. the number of pallet supports, or by increasing or decreasing the number of machine tools 20.

Referring again to FIG. 1, the flow of the control signal will be described below. A control unit 200 is provided which is connected to each machine tool 20, the pallet carrier, and an operator panel 202 of the pallet supply apparatus. The information necessary for operation is stored beforehand in the control unit 200. This information concerns the order of machining a workpiece, the corresponding relationship between the workpiece and the program for NC control, the movement of the pallet carrier, and so on. The control unit 200 sends the information suitably to each machine tool 20, the pallet carrier, and the operator panel 202, so that an efficient automatic operation may be achieved for the whole machining system. As the operator panel 202 is disposed near the preparation station 44, the operator can easily input the working data including calling the pallet to the preparation station 44 and inputting a finish of the preparation. The control unit 200 can continue the automatic operation in response to the information from the operator panel 202.

Referring again to FIG. 8, the control unit 200 is connected to four machine tools 20, the pallet carrier, and the operator panel 202 of the pallet supply apparatus. The flow of the control signal and the operator's operation of the operator panel 202 are the same as in FIG. 1. The control unit 200 is also connected to a central controller 204. The central controller 204 stores machining achievements and fault results to be displayed on a display 206. And the central controller 204 stores the program for NC control to operate the NC circuit of each machine tool 20.

From the foregoing, it will be appreciated that there is provided, according to this invention, a compact pallet supply apparatus, as pallet supports can be disposed in a dead area such as between machine tools, and thus an extra floor area is not needed as a preparation station. Further, the pallet supply apparatus of the present invention can handle heavy pallets since the pallet carrier lifts or lowers the pallet from the position just under the pallet, and since the pallet carrier does not need the forward and backward mechanism of a fork, the structure is simple, and the area to allow the fork to rotate is not needed. Further, where the rows of pallet supports are constructed by modules, an increase or decrease in the number of pallets can be easily achieved by changing the number of modules, in response to a change of the number of machine tools or a change of the number of pallets needed for one machine tool.

We claim:

1. A pallet supply apparatus for at least one machine tool arranged along a predetermined arranging line, the apparatus having a plurality of pallet supports, each pallet support being capable of supporting a pallet, comprising:
   a first row of pallet supports disposed along a line including at least one pallet exchange station which is disposed immediately in front of said machine tool;
   means for exchanging pallets between said machine tool and said pallet exchange station;
   a second row of pallet supports disposed in parallel with said first row of pallet supports and placed at a predetermined distance from said first row;
   guide means in parallel with said two rows and disposed therebetween; and
   a pallet carrier movable along said guide means and movable at a right angle to said guide means, the pallet carrier having means for lifting a pallet from beneath, or lowering a pallet onto one of said pallet supports of said first and second rows when said pallet carrier arrives at a point under the pallet.

2. A pallet supply apparatus as claimed in claim 1, said guide means guiding said pallet carrier during movement of said pallet carrier in parallel with said two rows; and
said lifting means being arranged so as to be moved at a right angle to said first and second rows when said pallet carrier is to access said one of said pallet supports.

3. A pallet supply apparatus as claimed in claim 2, wherein said guide means comprises rails extending in parallel with said first and said second rows of pallet supports.

4. A pallet supply apparatus as claimed in claim 1, wherein said pallet exchange means comprises means for exchanging one pallet held by said machine tool and another one pallet positioned at said pallet exchange station by a single exchange operation.

5. A pallet supply apparatus as claimed in claims 1 or 2, further comprising at least one preparation station for removing a machined workpiece from a pallet and setting a workpiece to be machined on a pallet, said preparation station being located on a predetermined one of said pallet supports of said first and second rows of pallet supports.

6. A pallet supply apparatus as claimed in claim 2, wherein said pallet carrier further comprises:
    a carrier base movable along said pallet carrier guiding means;
    rail means for guiding said lifting means at a right angle to said two rows, said rail means being disposed on said carrier base;
    a first driving means for moving said carrier base along said pallet carrier guiding means and positioning said carrier base at a position corresponding to a desired pallet support of said two rows of pallet supports;
    a carrier saddle movable along said rail means on said carrier base; and
    a second driving means for moving said carrier saddle along said rail means and positioning said carrier saddle at a position under a desired pallet resting on said desired pallet support,
    said lifting means being installed on said carrier saddle and lifting said desired pallet relative to said carrier saddle in the position under said desired pallet to lower said pallet onto another pallet support in a position under said another pallet support.

7. A pallet supply apparatus as claimed in claim 6, wherein said carrier base comprises a plate for removing chips and other dropped matter from said pallet supply apparatus toward the outside when said carrier base is moving along said carrier guiding means.

8. A pallet supply apparatus as claimed in claim 6, wherein said lifting means comprises:
    cylinder-piston means actuated by a pressurized fluid and capable of directly lifting a pallet from the underside of said pallet; and
    fluid feeding equipment for feeding pressurized fluid to said cylinder-piston means.

9. A pallet supply apparatus as claimed in claim 6, wherein said lifting means comprises:
    feed screw means movable toward and away from a pallet resting on one of said pallet supports; and
    driving means for driving said feed screw means.

10. A pallet supply apparatus as claimed in claim 6, wherein said first driving means comprises:
    a toothed rack fixed along said pallet carrier guiding means, said pallet carrier guiding means comprising rails extended in parallel with said two rows;
    a driving motor fixed on said carrier base; and
    a sprocket fixed on a shaft of said driving motor and engaged with said toothed rack.

11. A pallet supply apparatus as claimed in claim 6, wherein said second driving means comprises:
    a driving motor fixed on said carrier base;
    a ball screw shaft supported rotatively on said carrier base and extended at a right angle to said two rows and able to be driven by said driving motor; and
    nut means fixed on said carrier saddle and engaged with said ball screw shaft so as to move with said carrier saddle in response to rotation of said ball screw shaft.

12. A pallet supply apparatus as claimed in claim 5, wherein a pallet support located on said preparation station comprises:
    bearing means for supporting a pallet resting on said pallet support rotatively in a horizontal plane; and
    means for positioning said pallet at a desired rotating position.

13. A pallet supply apparatus as claimed in claim 1, wherein said first and second rows of pallet supports are constructed by a plurality of pallet support modules, and each module comprises:
    a first unitary row of said first row of pallet supports;
    a second unitary row of said second row of pallet supports; and
    joining means for joining another pallet support module to each end of said each module, said each end being an end in the same direction as a direction in which said first and second unitary rows are extended.

14. A pallet supply apparatus as claimed in clai 13, wherein at least one of said plurality of pallet support modules comprises:
    the first unitary row which is immediately in front of said machine tool; and
    the second unitary row which is immediately in front of a different machine tool.

15. A pallet supply apparatus as claimed in clai or 13, wherein said plurality of pallet support modules comprise at least one additional module which does not face a machine tool, and wherein each pallet support of said first unitary row of said additional module faces each pallet support of said second unitary row and the number of pallet supports of said first unitary row is the same as the number of pallet supports of said second unitary row.

16. A pallet supply apparatus as claimed in claim 2, further comprising at least one preparation station for removing a machined workpiece from a pallet and setting a workpiece to be machined on a pallet, said preparation station being located on a predetermined one of said pallet supports of said first and second rows of pallet supports.

17. A pallet supply apparatus as claimed in claim 14, wherein said plurality of pallet support modules comprise at least one additional module which does not face a machine tool, and wherein each pallet support of said first unitary row of said additional module faces each pallet support of said second unitary row and the number of pallet supports of said first unitary row is the same as the number of pallet supports of said second unitary row.

18. A pallet supply apparatus as claimed in claim 14, wherein said plurality of pallet support modules comprise:
    at least one preparation station for removing a machined workpiece from a pallet and setting a workpiece to be machined on a pallet, said preparation station being located on a predetermined one of said pallet supports of said first unitary row; and
    at least one different preparation station for removing a machined workpiece from a pallet and setting a workpiece to be machined on a pallet, said another preparation station being located on a predetermined one of said pallet supports of said second unitary row.

19. A pallet supplying apparatus for transferring a pallet between at least one machine tool and a pallet storage area, comprising:

at least one pallet support module arranged along a line which is adjacent to said machine tool, said module, comprising:
- a first unitary row of pallet supports disposed along said line;
- a second unitary row of pallet supports disposed in parallel with said first unitary row of pallet supports and placed at a predetermined distance from said first unitary row, said predetermined distance being the same for each pallet support module; and
- joining means for joining another pallet support module to each end of said module, said each end being an end in the same direction as the direction in which said first and second unit rows are extended; and
- a pallet carrier disposed between a first row which is constructed by an arrangement of at least one said first unitary row along said line, and a second row which is constructed by an arrangement of at least one said second unitary row along said line, being movable in parallel with said line, comprising:
  - means for lifting one pallet resting on one pallet support of said first or second row and lowering said one pallet onto another pallet support; and
  - guiding means for guiding said lifting means at a right angle to said line.

20. A pallet supply apparatus for transferring a pallet between at least one machine tool arranged along a predetermined arranging line, and a pallet storage area having a plurality of pallet supports, each pallet support being capable of supporting a pallet, comprising:
- at least one pallet support module arranged in parallel with said line which module is adjacent to said machine tool, said module having:
- a first unitary row of pallet support disposed along said line;
- a second unitary row of pallet supports disposed in parallel with said first unitary row of pallet supports and placed at a predetermined distance from said first unitary row, said predetermined distance being the same for each pallet support module;
- joining means for joining another pallet support module to each end of said module, said each end being an end in the same direction as the direction in which said first and second unitary rows are extended; and
- guide means in parallel with said first and second unitary rows and disposed therebetween; and
- a pallet carrier movable along said guide means and movable at a right angle to said guide means, the pallet carrier having:
- means for lifting a pallet form from beneath, or lowering a pallet onto one of said pallet supports of a first and a second row, each of these rows constructed by an arrangement of at least one said first or second unitary row, when said pallet carrier arrives at a point under the pallet.

* * * * *

UNITED STATES PATENT AND TRADEMARK OFFICE
CERTIFICATE OF CORRECTION

PATENT NO. : 4,747,193
DATED : May 31, 1988
INVENTOR(S) : Akitake HASHIDATE; Katsuyuki NAKAMURA It is certified that error appears in the above-identified patent and that said Letters Patent is hereby corrected as shown below:

Column 11, line 3 change "in claims 1 or 2" to --in claim 1--.

Column 12, line 20 change "clai" to --claim--;

line 27 change "clai or" to --claim--.

Column 14, line 23 delete --form--.

Signed and Sealed this

Sixth Day of December, 1988

Attest:

DONALD J. QUIGG

Attesting Officer      Commissioner of Patents and Trademarks